Patented Jan. 18, 1949

2,459,146

UNITED STATES PATENT OFFICE 2,459,146

PURIFICATION OF GAMMA-PICOLINE

Robert S. Bowman, Pittsburgh, Pa., assignor to Jones & Laughlin Steel Corporation, Pittsburgh, Pa., a corporation of Pennsylvania No Drawing. Application January 7, 1947, Serial No. 720,677

3 Claims. (Cl. 260—290)

This invention relates to a process for purifying 4- or gamma-picoline from a mixture of this substance and one or both of the related pyridine bases 3- or beta-picoline and 2,6-lutidine.

An object of my invention is to provide a process for obtaining 4-picoline in a state of substantial purity from the mixture of pyridine bases known industrially as the "beta-gamma-picoline fraction." Another object is to provide a process for obtaining substantially pure 4-picoline from binary mixtures of this and either of the before-mentioned pyridine bases.

The so-called "beta-gamma-picoline fraction," obtained from the fractional distillation of coal tar or from coke oven gas, comprises the three pyridine bases boiling in the neighborhood of 144° C. These are beta- or 3-picoline, boiling at 144.0° C., gamma- or 4-picoline, boiling at 144.6° C., and 2,6-lutidine, boiling at 144.4° C. All three of these components are industrially useful, but because of the virtual coincidence of their boiling points and the complete miscibility of all three with water, alcohols, ketones, and hydrocarbon solvents, they cannot be separated by conventional distillation or solvent extraction processes, nor is it possible to separate binary mixtures of these bases by conventional methods. I have invented a process for obtaining 4-picoline with a high degree of purity from binary or ternary mixtures of these bases. My process may also be adapted to fractionate the ternary mixture of pyridine bases into its components, of which the 4-picoline can be obtained in a high state of purity. My invention is based on the technique of fractional freezing or crystallization.

The melting points of the pure pyridine bases are fairly well separated. Gamma- or 4-picoline melts at +3.8° C., 2,6-lutidine at —6° C., and beta- or 3-picoline at —18.3° C. It would appear that this range is great enough to afford at least a partial separation of these constituents by fractional freezing, but this is not, in fact, the case. All three constituents exhibit the phenomenon of undercooling to such an extent that when freezing finally starts the entire mixture solidifies in an amorphous mass. I have discovered, however, that compounds or adducts of these bases with o-phenylphenol exhibit under-cooling characteristics such that the 4-picoline-o-phenylphenol adduct can be recovered by fractional crystallization in a state of substantial purity from binary or ternary mixtures of the pyridine bases, and the 2,6-lutidine adduct may also be separated under proper conditions. My process, then, comprises the addition of o-phenylphenol to the mixture of pyridine bases, controlled cooling to produce selective crystallization, filtering or centrifuging to separate solid and liquid phases, and finally, if desired, resolution of the o-phenylphenolates into the liquid bases and o-phenylphenol.

When o-phenylphenol is added to a warm mixture of the above mentioned pyridine bases and the solution slowly cooled, the 4-picoline-o-phenylphenol compound crystallizes completely at room temperature. These crystals may be separated from the liquid by filtering or centrifuging. Further cooling to 0° C. does not result in the crystallization of either of the other o-phenylphenol compounds unless the mixture is seeded with crystals of 2,6-lutidine o-phenylphenolate or even 4-picoline-o-phenylphenolate, either of which will initiate crystallization of the 2,6-lutidine-o-phenylphenol adduct. This adduct may be removed, with difficulty, from the viscous liquid remaining by filtering or centrifuging. The 3-picoline-o-phenylphenol adduct supercools to such an extent that it cannot be crystallized.

Substantially pure 4-picoline, in the form of an o-phenylphenolate, may be obtained from a binary mixture of 3- and 4-picolines by the method outlined in the previous paragraph, leaving 3-picoline contaminated with some 4-picoline, both in the adduct form.

The yield of the 4-picoline adduct, either from the binary or ternary mixtures, is considerably improved if a solvent is added to the mixture of bases and o-phenyphenol. Hydrocarbon solvents appear to have the least retarding effect upon the crystallization of the 4-picoline-o-phenylphenolate, and, of the hydrocarbons, benzene, preferably mixed with a paraffin hydrocarbon such as iso-octane, is preferred. The solvent reduces the viscosity of the liquid at low temperature; facilitates filtering or centrifuging, and increases the amount of solid recovered. When a solvent is used it is generally necessary to cool the mixture to a lower temperature to obtain effective crystallization of the 4-picoline adduct. In the case of the preferred benzene-iso-octane mixture this temperature is —9° C. or less.

A preferred embodiment of my process will now be described in detail. To a mixture of 3- and 4-picolines in about equal amounts, a stoichiometrically equivalent quantity of o-phenylphenol was added, as well as a solvent composed of approximately equal parts of benzene and iso-octane. The mixture was then cooled slowly to —10° C., during which crystals of the 4-picoline-o-phenylphenol formed. These were separated from the remaining 3-picoline concentrate by centrifuging, when it was found that about 65% of the 4-picoline had been recovered, in the form of the o-phenylphenolate. This yield is dependent upon the temperature to which the mixture is cooled, as when the mixture is cooled to 0° C., only about 50% of the 4-picoline is recovered.

The adducts of all three bases may be resolved into their components by steam distillation through a short fractionating column. The pyridine base distills off, leaving the o-phenylphenol as a solid in the distillation flask. The purity of the 4-picoline so obtained is high, and may be increased to nearly 100% by recrystallizing the 4-picoline-o-phenylphenolate before resolving.

The invention is not limited to the preferred embodiment but may be otherwise embodied or practiced within the scope of the following claims.

I claim:

1. The process of purifying 4-picoline which is contaminated with 3-picoline, comprising adding o-phenylphenol and a hydrocarbon solvent, cooling slowly to a temperature of about −10° C. to cause selective crystallization of the 4-picoline o-phenylphenolate, separating the solid o-phenylphenolate from the liquid, and fractionally distilling the respective o-phenylphenolates to regenerate the pyridine bases.

2. The process of purifying 4-picoline which is contaminated with at least one of the pyridine bases 3-picoline and 2,6-lutidine, comprising adding o-phenylphenol to the warm mixture of bases, cooling slowly to a temperature low enough to cause crystallization of 4-picoline-o-phenylphenolate but to retain the other pyridine base o-phenylphenolates in solution, separating the solid o-phenolate from the liquid and regenerating the pyridine bases from their respective o-phenylphenolates.

3. The process of purifying 4-picoline which is contaminated with at least one of the pyridine bases 3-picoline and 2,6-lutidine, comprising adding o-phenylphenol and a solvent to the mixture of bases, cooling slowly to a temperature low enough to cause crystallization of 4-picoline-o-phenylphenolate but to retain the other pyridine base o-phenylphenolates in solution, separating the solid o-phenolate from the liquid and regenerating the pyridine bases from their respective o-phenylphenolates.

ROBERT S. BOWMAN.

REFERENCES CITED

The following references are of record in the file of this patent:

UNITED STATES PATENTS

| Number | Name | Date |
| --- | --- | --- |
| 2,402,150 | Glowaki | June 18, 1946 |
| 2,432,063 | Cislak | Dec. 2, 1947 |
| 2,432,064 | Cislak | Dec. 2, 1947 |

OTHER REFERENCES

Lemmerman: J. American Chem. Soc., July 1946, vol. 63, pp. 1361–4.

Certificate of Correction

January 18, 1949.

Patent No. 2,459,146.

ROBERT S. BOWMAN

It is hereby certified that errors appear in the printed specification of the above numbered patent requiring correction as follows:

Column 4, line 26, list of references cited, for the patent number "2,402,150," read *2,402,158*; line 32, same column, for "vol. 63, pp. 1361–4" read *vol. 68, pp. 1361–4*;

and that the said Letters Patent should be read with these corrections therein that the same may conform to the record of the case in the Patent Office.

Signed and sealed this 28th day of June, A. D. 1949.

[SEAL]

THOMAS F. MURPHY,
*Assistant Commissioner of Patents.*